(12) United States Patent
Alexandrovichserov et al.

(10) Patent No.: US 8,057,961 B2
(45) Date of Patent: Nov. 15, 2011

(54) CATALYST FOR A FUEL CELL, A METHOD FOR PREPARING THE SAME, AND A MEMBRANE-ELECTRODE ASSEMBLY FOR A FUEL CELL AND A FUEL CELL SYSTEM INCLUDING THE SAME

(75) Inventors: Alexey Alexandrovichserov, Suwon-si (KR); Chan Kwak, Suwon-si (KR); Si-Hyun Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1233 days.

(21) Appl. No.: 11/797,068

(22) Filed: Apr. 30, 2007

(65) Prior Publication Data

US 2008/0152979 A1    Jun. 26, 2008

(30) Foreign Application Priority Data

Apr. 28, 2006    (KR) .................. 10-2006-0038794

(51) Int. Cl.
*H01M 4/90* (2006.01)
*B01J 23/00* (2006.01)

(52) U.S. Cl. ........ 429/526; 429/523; 429/532; 502/313; 502/321; 502/439

(58) Field of Classification Search .......... 429/400–535; 502/74, 100, 103, 313, 321
See application file for complete search history.

(56) References Cited

U.S. PATENT DOCUMENTS

| | | | |
|---|---|---|---|
| 3,929,608 | A | 12/1975 | Degueldre et al. |
| 4,545,883 | A | 10/1985 | Ovshinsky et al. |
| 2003/0016638 | A1* | 1/2003 | Philips .................. 370/329 |
| 2003/0175562 | A1* | 9/2003 | Taguchi et al. ............ 429/19 |
| 2004/0086772 | A1 | 5/2004 | Chianelli et al. |
| 2005/0074656 | A1 | 4/2005 | Koyama et al. |
| 2005/0176990 | A1 | 8/2005 | Coleman et al. |
| 2005/0186460 | A1* | 8/2005 | Kanaoka et al. ........... 429/30 |
| 2005/0214610 | A1* | 9/2005 | Yoshimura et al. ......... 429/30 |
| 2007/0128501 | A1 | 6/2007 | Alonso-Vante et al. |
| 2007/0212592 | A1 | 9/2007 | Alexandrovichserov et al. |
| 2007/0218350 | A1 | 9/2007 | Alexandrovichserov et al. |

(Continued)

FOREIGN PATENT DOCUMENTS

CN    1523695    8/2004

(Continued)

OTHER PUBLICATIONS

European Search Report dated Nov. 2, 2006 for European Patent application 06117868.7, in the name of Samsung SID Co., Ltd.

(Continued)

*Primary Examiner* — Jonathan Crepeau
*Assistant Examiner* — Muhammad Siddiquee
(74) *Attorney, Agent, or Firm* — Robert E. Bushnell, Esq.

(57) ABSTRACT

The cathode catalyst includes a zeolite-containing carrier, and a ruthenium (Ru)-M-tellurium (Te) alloy supported on the carrier, where M is selected from the group consisting of tungsten (W), molybdenum (Mo), and combinations thereof. The cathode catalyst has a high activity and selectivity for a reduction reaction of an oxidant, and is highly stable under an acidic atmosphere thereby being capable of improving performances of a membrane-electrode assembly and fuel cell system.

21 Claims, 2 Drawing Sheets

U.S. PATENT DOCUMENTS

| | | |
|---|---|---|
| 2007/0264560 A1 | 11/2007 | Alexandrovichserov et al. |
| 2007/0275290 A1 | 11/2007 | Alexandrovichserov |
| 2008/0090118 A1 | 4/2008 | Gorobinskiy et al. |

FOREIGN PATENT DOCUMENTS

| | | |
|---|---|---|
| CN | 1632975 | 6/2005 |
| DE | 3624054 | 1/1988 |
| DE | 3802236 | 8/1989 |
| DE | 19644628 | 4/1998 |
| DE | 10052189 | 5/2002 |
| GB | 1358926 | 7/1974 |
| JP | 59-47391 | 3/1984 |
| JP | 2004-146223 | 5/2004 |
| JP | 2005-026225 | 1/2005 |
| JP | 2005-063677 | 3/2005 |
| JP | 2006-202643 | 8/2006 |
| KR | 10-2002-0084825 | 11/2002 |
| WO | WO 2004/023581 | 3/2004 |
| WO | WO 2005/008813 | 1/2005 |
| WO | WO 2006/137302 | 12/2006 |

OTHER PUBLICATIONS

Fischer, et al., Electrocatalytic properties of mixed transition metal tellurides (Chevrel-phases) for oxygen reduction, Journal of Applied Electrochemistry, vol. 25, (1995) m oo 1004-1008, XP 008070336.

U.S. Office action dated Jun. 2, 2009 for related U.S. Appl. No. 11/491,012.

U.S. Office action dated Nov. 10, 2009 for related U.S. Appl. No. 11/491,012.

U.S. Office action dated May 5, 2009 for related U.S. Appl. No. 11/491,012.

\* cited by examiner

CATALYST FOR A FUEL CELL, A METHOD FOR PREPARING THE SAME, AND A MEMBRANE-ELECTRODE ASSEMBLY FOR A FUEL CELL AND A FUEL CELL SYSTEM INCLUDING THE SAME

CROSS-REFERENCE TO RELATED APPLICATION AND CLAIM OF PRIORITY

This application makes reference to, incorporates the same herein, and claims all benefits accruing under 35 U.S.C.§119 from an application for CATALYST FOR CATHOD OF FUEL CELL, METHOD FOR PREPARING SAME, AND MEMBRANE-ELECTRODE ASSEMBLY FOR FUEL CELL AND FUEL CELL SYSTEM COMPRISING SAME earlier filed in the Korean Intellectual Property Office on 28 Apr. 2006 and there duly assigned Serial No. 10-2006-0038794.

FIELD OF THE INVENTION

The present invention relates to a catalyst for a fuel cell, to a method of manufacturing the same, to a membrane-electrode assembly including the same, and to a fuel cell system including the same. More particularly, the present invention relates to a cathode catalyst for a fuel cell having an improved activity and selectivity for an oxidant reduction reaction and that is capable of improving performance of the membrane-electrode assembly and a fuel cell system, to a method of manufacturing the same, to a membrane-electrode assembly including the same, and to a fuel cell system including the same.

BACKGROUND OF THE INVENTION

A fuel cell is a power generation system for producing electrical energy through an electrochemical redox reaction of an oxidant and fuel such as hydrogen, or a hydrocarbon-based material such as methanol, ethanol, natural gas, and the like.

The polymer electrolyte membrane fuel cell is a clean energy source that is capable of replacing fossil fuels. It has advantages such as high power output density and energy conversion efficiency, operability at room temperature, and being small-sized and tightly sealed. Therefore, it can be applicable to a wide array of fields such as non-polluting automobiles, and electricity generation systems and portable power sources for mobile equipment, military equipment, and the like.

Representative exemplary fuel cells include a polymer electrolyte membrane fuel cell (PEMFC) and a direct oxidation fuel cell (DOFC).

The direct oxidation fuel cell includes a direct methanol fuel cell that uses methanol as fuel.

The polymer electrolyte membrane fuel cell has an advantage of a high energy density and high power, but also has problems in the need to carefully handle hydrogen gas and the requirement of additional devices such as a fuel reforming processor for reforming methane or methanol, natural gas, and the like in order to produce hydrogen as the fuel gas.

On the contrary, a direct oxidation fuel cell has a lower energy density than that of the gas-type fuel cell but has the advantages of easy handling of the liquid-type fuel, a low operation temperature, and no need for additional fuel reforming processors. Therefore, it has been acknowledged as an appropriate system for a portable power source for small and common electrical equipment.

In the above-mentioned fuel cells, a stack that generates electricity includes several to scores of unit cells stacked adjacent to one another, and each unit cell is formed of a membrane-electrode assembly (MEA) and a separator (also referred to as a bipolar plate).

The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

Fuel is supplied to an anode and adsorbed on catalysts of the anode, and the fuel is oxidized to produce protons and electrons. The electrons are transferred into a cathode via an outer-circuit, and the protons are also transferred into the cathode through the polymer electrolyte membrane.

In addition, an oxidant is supplied to the cathode, and then the oxidant, the protons, and the electrons are reacted on catalysts of the cathode to produce electricity along with water.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an improved catalyst, an improved membrane-electrode assembly, an improved fuel cell system, and methods of making them.

An embodiment of the present invention provides a highly active cathode catalyst for a fuel cell.

Another embodiment of the present invention provides a method for manufacturing the cathode catalyst.

Yet another embodiment of the present invention provides a membrane-electrode assembly that includes the high active catalyst.

Still another embodiment of the present invention provides a fuel cell system that includes the membrane-electrode assembly.

According to an embodiment of the present invention, a catalyst is provided, which includes a carrier, and a ruthenium (Ru)-M-tellurium (Te) alloy supported on the carrier, where M is selected from the group consisting of tungsten (W), molybdenum (Mo), and combinations thereof.

According to an embodiment of the present invention, a catalyst is provided, which includes a carrier comprising zeolite, and a ruthenium (Ru)-M-tellurium (Te) alloy supported on the carrier, where M is selected from the group consisting of tungsten (W), molybdenum (Mo), and combinations thereof.

According to another embodiment of the present invention, a method of manufacturing a catalyst, which includes adding a Ru source, a M source, and a Te source to a zeolite-containing dispersion, where M is selected from the group consisting of tungsten (W), molybdenum (Mo), and combinations thereof to obtain a mixture, adding a reducing agent to the resulting mixture to perform a reduction, filtrating the resultant product after performing the reduction, and drying the filtrate.

According to still another embodiment of the present invention, a membrane-electrode assembly is provided, which includes a cathode and an anode facing each other, and an electrolyte interposed therebetween. The cathode includes the above cathode catalyst.

According to an embodiment of the present invention, a fuel cell system is provided, which includes at least one electricity generating element, a fuel supplier, and an oxidant supplier. The electricity generating element includes a membrane-electrode assembly and separators arranged at each side thereof. The membrane-electrode assembly includes a cathode, an anode, and a polymer electrolyte membrane interposed therebetween. The cathode includes the above cathode catalyst.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
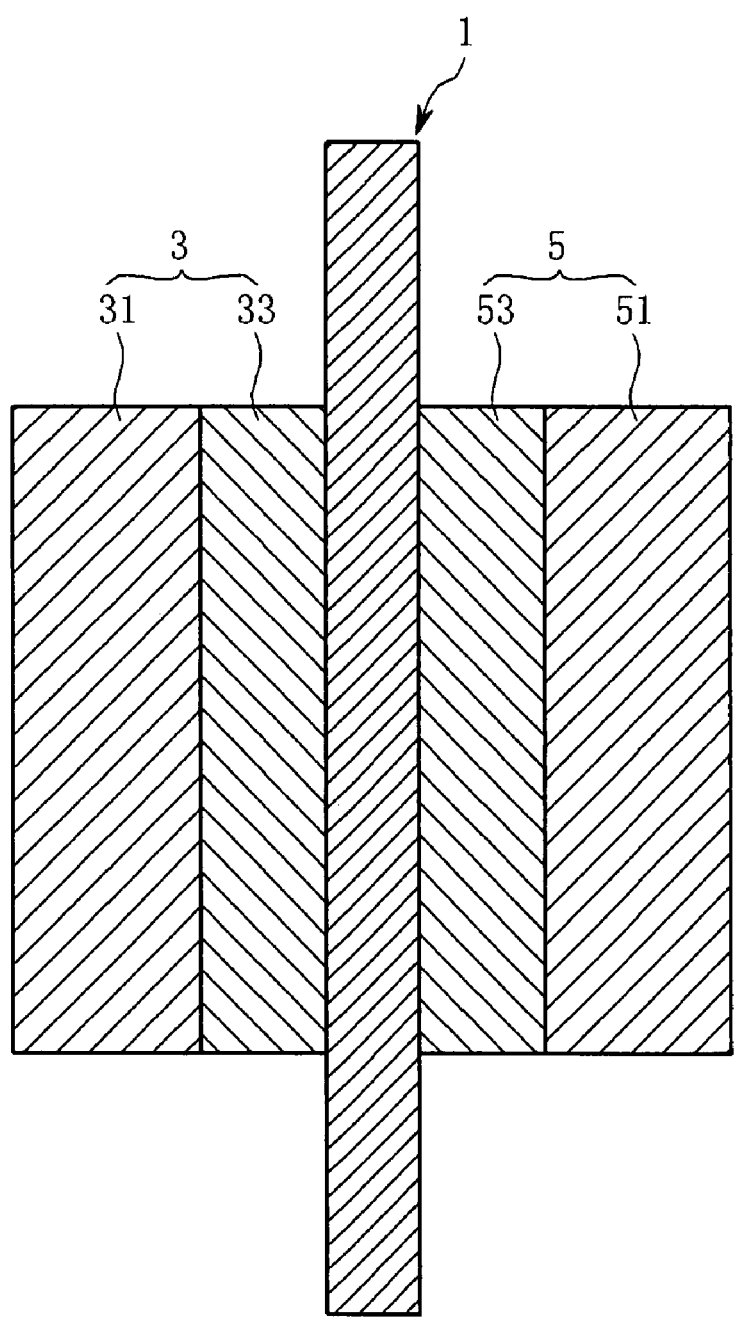
FIG. 1 is a schematic cross-sectional view showing a membrane-electrode assembly according to one embodiment of the present invention.

Exemplary embodiments of the present invention will hereinafter be described in detail with reference to the accompanying drawings.

A fuel cell is a power generation system for generating electrical energy through oxidation of fuel and reduction of an oxidant. The oxidation of the fuel occurs at an anode, while the reduction of the oxidant occurs at a cathode.

Both of the anode and the cathode include each a catalyst layer that includes a catalyst to catalyze the oxidation of the fuel or the reduction of the oxidant. An example of the catalyst (also referred to as "anode catalyst") for the anode catalyst layer representatively includes platinum-ruthenium, while an example of the catalyst (also referred to as "cathode catalyst") for the cathode catalyst layer may include platinum.

However, the platinum as a cathode catalyst has a problem of being lowly selected for reduction of an oxidant. It can also be depolarized by fuel over-crossed toward the cathode through an electrolyte membrane, thereby being inactivated in a direct oxidation fuel cell. Therefore, more attention has been paid to another catalyst, which can substitute for the platinum.

The cathode catalyst according to one embodiment of the present invention includes a zeolite-containing carrier, and a ruthenium (Ru)-M-tellurium (Te) alloy supported on the carrier, where M is selected from the group consisting of tungsten (W), molybdenum (Mo), and combinations thereof.

More particularly, the catalyst has a structure where a Ru-M-Te alloy is supported on a zeolite matrix.

The zeolite has hydrophilicity due to acidic protonic groups presented at its surface. Accordingly, it has low resistance and a reduced resistance electric power loss. In addition, the zeolite has a highly regular structure of pores and chambers that allows some molecules to pass through. That is, the zeolite has a channel arrangement thereby showing relatively high gas transmission properties. The zeolite may include at least one selected from the group consisting of A-, X-, and Y-type zeolite having comparatively large pores. The X-type zeolite has been formed as an electrode of DMFC by a sputtering method, and the Y-type zeolite is known to play an important role in a copper-based electrocatalyst. However, it is preferable to use the Y-type zeolite having a three-dimensional channel structure, thereby having a high reaction activity.

Further, the zeolite may include at least one cation selected from the group consisting of an alkali metal ion, an alkaline-earth metal ion, and a proton. According to one embodiment, the cation may be $Na^+$.

The zeolite-containing carrier may further include a carbon-based material to compensate electrical conductivity.

The carbon-based material may includes at least one selected from the group consisting of graphite, denka black, ketjen black, acetylene black, carbon nanotubes, carbon nanofiber, carbon nanowire, carbon nanoballs, activated carbon, and combination thereof.

The carrier as above supports a Ru-M-Te alloy.

Ru in the Ru-M-Te alloy has high catalyst activity for reduction of an oxidant. However, oxygen in the air tends to be easily adsorbed to Ru, the active center of Ru are blocked by the oxygen adsorbed to Ru, resulting in deterioration of reduction of an oxidant.

On the contrary, Te in the Ru-M-Te alloy prevents combination of oxygen in the air and Ru, thereby playing a role of promoting reduction of an oxidant and suppressing oxidation of fuel.

M in the Ru-M-Te alloy includes W or Mo which has various oxidation numbers. The W or Mo plays a role of further increasing catalyst activity and selectivity for reduction of an oxidant when it is used to form a catalyst with Ru and Te.

The Ru-M-Te alloy may include 50 to 70 atom % of Ru, 25 to 30 atom % of M, and 5 to 30 atom % of Te. According to one embodiment, the Ru-M-Te alloy may include 60 to 65 atom % of Ru, 27 to 29 atom % of W, and 15 to 25 atom % of Te.

When Ru is included in an amount of less than 50 atom %, it may deteriorate catalyst activity, while when more than 70 atom %, it may deteriorate selectivity. When M is included in an amount of less than 25 atom %, it may deteriorate catalyst activity, while when more than 30 atom %, it may lead particles of a catalyst to have a large size. In addition, when Te is included in an amount of less than 5 atom %, a catalyst may be nonselective, while when more than 30 atom %, it may deteriorate catalyst activity.

The Ru-M-Te alloy with the above composition ratio may be supported on a carrier in an amount of 5 to 85 wt % based on a total weight of a catalyst. According to one embodiment, the Ru-M-Te alloy may be supported in an amount of 10 to 60 wt %. When the Ru-M-Te alloy is supported in an amount of less than 5 wt %, a catalyst is so small an amount that it may deteriorate catalyst activity. However, when more than 85 wt %, a catalyst may form too large aggregate size and have a decreased specific surface area for a reaction, thereby having deteriorated activity.

The catalyst may have an average particle size of a nano-size, and preferably an average particle size of 1 to 4 nm. When the catalyst has a particle size within the above range, it may not have too large-sized aggregate particles and catalyst activity does not deteriorate. Since the catalyst has very small-sized particles and increased surface area for catalyst activity, it may have very high activity. In particular, the catalyst has higher activity than that of a RuSe/C catalyst, which has been researched as a substitute for platinum.

The cathode catalyst can be manufactured by the following exemplary method: a Ru source, a M source, and a Te source are added to zeolite-containing dispersion, where M is selected from the group consisting of tungsten (W), molybdenum (Mo), and combinations thereof to obtain a mixture, a reducing agent is added to the resulting mixture to perform a reduction, and the resultant product is filtrated and the filtrate is dried.

First, the Ru source, the M source, and the Te source are added to zeolite-containing dispersion.

The zeolite-containing dispersion is prepared by dispersing the zeolite in a solvent such as water, alcohol, or a mixed solvent thereof. The zeolite is the same as the above-described.

The zeolite can be used in a controlled amount, considering an amount of the zeolite remaining in the resultant produced catalyst.

The zeolite-containing dispersion may further include a carbon-based material to improve conductivity of the zeolite.

The carbon-based material is the same as the above-described, and can be used in a controlled amount considering a remaining amount in the resultant produced catalyst.

The Ru source may be a Ru-containing water-soluble salt such as ruthenium chloride, ruthenium acetyl acetonate, ruthenium nitrozylnitrate, or mixtures thereof.

The M source may be a water-soluble salt including an element selected from the group consisting of Mo, W, and combinations thereof.

For example, when M is Mo, $Mo(CO)_6$ may be used, and when M is W, $W(CH_3COO)_3$ may be used.

The Te source may be selected from the group consisting of Te powders, a Te-containing oxide such as $H_2TeO_3$, and mixtures thereof.

The Ru source, the M source, and the Te source may be appropriately regulated, depending on a desired amount ratio of each component in the final catalyst.

To the prepared above mixture, a reducing agent is added to reduce an alloy supported on a carrier, and is subjected to filtration.

The reducing agent may include a compound selected from the group consisting of $NaBH_4$, $N_2H_4$, and mixtures thereof.

The resulting filtrate is dried to obtain a cathode catalyst.

The drying may be performed at 60 to 130° C., and preferably 80 to 100° C. When the drying temperature is less than 60° C., it takes too long to dry the resulting filtrate, whereas when it is more than 130° C., it is not preferable because a particle size may increase due to particle aggregation. In the embodiment of the present invention, the drying is performed at such a low temperature so that nano-sized catalysts can be obtained.

The drying may be performed under a reduction atmosphere including hydrogen, nitrogen, or a mixed gas.

The catalyst prepared according to the above method has high activity and selectivity for a reduction reaction of an oxidant and can effectively be used as a cathode catalyst of a fuel cell.

According to another embodiment of the present invention, a membrane-electrode assembly includes the cathode catalyst.

FIG. 1 is a schematic cross-sectional view showing a membrane-electrode assembly 131 according to one embodiment of the present invention. The membrane-electrode assembly 131 will be described in detail with the reference to FIG. 1.

The membrane-electrode assembly 131 of an embodiment of the present invention includes an anode 3 and a cathode 5 facing each other and a polymer electrolyte membrane 1 interposed therebetween. The anode 3 and cathode 5 each include a conductive substrate 31, 51 and a catalyst layer 33, 53 formed on the conductive substrate 31, 51.

The membrane-electrode assembly 131 generates electricity through fuel oxidation and oxidant reduction, and one or more membrane-electrode assembly constitutes a stack.

At the cathode catalyst layer 53 that includes a cathode catalyst, an oxidant reduction reaction occurs.

The cathode catalyst has high activity and selectivity for a reduction reaction of an oxidant, and thus can effectively improve performance of the cathode 5 and membrane-electrode assembly 131.

At the anode catalyst layer 33, a fuel oxidation reaction occurs. The anode catalyst layer 33 may include, for example, a platinum-based catalyst for catalyzing the reaction.

The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. In a direct oxidation fuel cell, since an anode catalyst may be poisoned by CO, CO-tolerant platinum-ruthenium alloy catalysts may be suitably used as an anode catalyst. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or one supported in a carrier.

The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used.

The catalyst layers 33 and 53 of the anode 3 and cathode 5 may further include a binder resin to improve its adherence and proton transfer properties.

The binder resin may be proton conductive polymer resins having a cation exchange group selected from the group consisting of a sulfonic acid group, a carboxylic acid group, a phosphoric acid group, a phosphonic acid group, and derivatives thereof at its side chain.

Non-limiting examples of the proton conductive polymer include perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In a preferred embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly (2,5-benzimidazole).

The binder resins may be used singularly or in combination. They may be used along with non-conductive polymers to improve adherence to a polymer electrolyte membrane. The binder resins may be used in a controlled amount to adapt to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, or combinations thereof.

The electrode substrates 31 and 51 of the anode and cathode support the anode and cathode, respectively, and provide a path for transferring fuel and oxidant to the catalyst layers 33 and 53. As for the electrode substrates 31 and 51, a conductive substrate is used, for example a carbon paper, a carbon cloth, a carbon felt, or a metal cloth, or a porous film including a metal cloth fiber or a metalized polymer fiber, but is not limited thereto.

The electrode substrates 31 and 51 may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL, not shown) can be added between the aforementioned electrode substrates 31 and 51 and the catalyst layers 33 and 53 to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition comprising a conductive powder, a binder resin, and a solvent on the conductive substrate.

The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

The polymer electrolyte membrane 1 plays a role of exchanging ions by transferring protons produced at an anode catalyst layer 33 to a cathode catalyst layer 53.

The proton conductive polymer for the polymer electrolyte membrane of the embodiment of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin for the polymer electrolyte membrane of the embodiment of the present invention include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly (2,5-benzimidazole).

H can be substituted with Na, K, Li, Cs, or tetrabutylammonium in a proton conductive group of the proton conductive polymer. When the H in an ion exchange group at the terminal end of the proton conductive group is substituted by Na, NaOH is used. When the H is substituted with tetrabutylammonium, tributylammonium hydroxide is used. K, Li, or Cs can also be substituted with using appropriate compounds. Since a method of substituting H is known in this related art, the method is not further described in detail.

According to another embodiment of the present invention, a fuel cell system including the above membrane-electrode assembly is provided.

A fuel cell system of an embodiment of the present invention includes at least one electricity generating element, a fuel supplier, and an oxidant supplier.

The electricity generating element includes a membrane-electrode assembly that includes a polymer electrolyte membrane and a cathode and an anode positioned at both sides of the polymer electrolyte membrane, and separators positioned at both sides of the membrane-electrode assembly. It generates electricity through oxidation of fuel and reduction of an oxidant.

The fuel supplier plays a role of supplying the electricity generating element with fuel including hydrogen, and the oxidant supplier plays a role of supplying the electricity generating element with an oxidant. The oxidant includes oxygen or air.

The fuel includes liquid or gaseous hydrogen, or a hydrocarbon-based fuel such as methanol, ethanol, propanol, butanol, or natural gas.

The fuel cell system may be applied to a polymer electrolyte membrane fuel cell (PEMFC), a direct oxidation fuel cell (DOFC), or a mixed reactant fuel cell.

The mixed reactant fuel cell includes the anode catalyst at an anode catalyst layer, which selectively catalyzes for oxidation of fuel, and the cathode catalyst at a cathode catalyst layer, which selectively catalyzes for reduction of an oxidant. Therefore, even if the fuel and oxidant mixture is provided to the anode and cathode catalyst layers, only oxidation of the fuel occurs at the anode catalyst layer, while only reduction of the oxidant occurs at the cathode catalyst layer.

Therefore, since the mixed reactant fuel cell does not need a separator which is necessary for a general fuel cell, the mixed reactant fuel cell can have advantages of decreasing manufacturing cost and down-sizing a fuel cell.

According to the embodiment of the present invention, since a cathode catalyst has excellent selectivity for reduction of oxygen, it can be more effectively used for a direct oxidation fuel cell having a cross-over problem of fuel and most effectively for a direct methanol fuel cell (DMFC).

Figure 2:
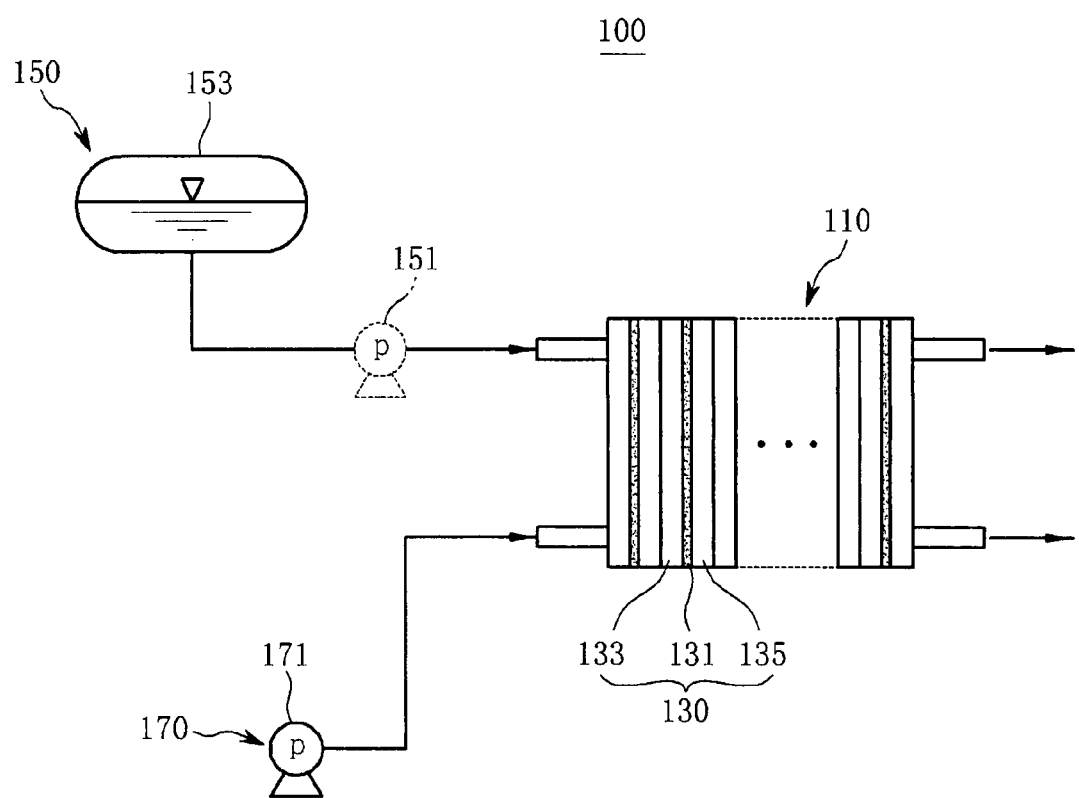
FIG. 2 schematically shows the structure of a fuel cell system according to one embodiment of the present invention.

FIG. 2 shows a schematic structure of a fuel cell system 100 that will be described in detail with reference to this accompanying drawing as follows. FIG. 2 illustrates a fuel cell system 100 wherein fuel and an oxidant are provided to the electricity generating element 130 through pumps 151 and 171, but the present invention is not limited to such structures. The fuel cell system of an embodiment of the present invention alternately includes a structure wherein fuel and an oxidant are provided in a diffusion manner.

The fuel cell system 100 includes a stack 110 composed of at least one electricity generating element 130 that generates electrical energy through an electrochemical reaction of fuel and an oxidant, a fuel supplier 150 for supplying the fuel to the electricity generating element 130, and an oxidant supplier 170 for supplying the oxidant to the electricity generating element 130.

In addition, the fuel supplier 150 is equipped with a tank 153, which stores fuel, and a fuel pump 151, which is connected therewith. The fuel pump 151 supplies fuel stored in the tank 153 with a predetermined pumping power.

The oxidant supplier 170, which supplies the electricity generating element 130 of the stack 110 with the oxidant, is equipped with at least one pump 171 for supplying the oxidant with a predetermined pumping power.

The electricity generating element 130 includes a membrane-electrode assembly 131, which oxidizes fuel such as hydrogen and reduces the oxidant, and separators 133 and 135 that are respectively positioned at opposite sides of the membrane-electrode assembly and supply fuel such as hydrogen, and an oxidant, respectively. At least one electricity generating element 130 constitutes a stack 110.

The following examples illustrate the present invention in more detail. However, it is understood that the present invention is not limited by these examples.

EXAMPLE 1

Preparation of Catalyst

NaY zeolite was prepared by ion-exchanging HY zeolite with 5M $NH_4NO_3$ twice, and then firing it at 550° C. for 24 hours.

3 g of the prepared NaY zeolite powder was dispersed in 1,000 $cm^3$ of water, and then a mixture powder of $RuCl_3$, $W(CH_3COO)_3$, and Te in a mole ratio of 2:1:1 was added in a drop-wise manner thereto up to 10 wt % of the entire disperse solution, preparing a mixture. The prepared mixture was agitated for 10 hours, and then 0.1M of $NaBH_4$ was added thereto to reduce an alloy supported on zeolite. The mixture was filtrated 10 hours later, and the filtrated resultants were dried at 80° C. under a nitrogen flow to prepare a catalyst including the Ru—W—Te alloy supported on zeolite.

The Ru—W—Te alloy included active materials of 54 atom % of Ru, 30 atom % of W, and 16 atom % of Te, and the active materials were supported in an amount of 47 wt %. The catalyst had an average particle diameter of 1.4 nm.

Preparation of Electrode

A working electrode was prepared by loading the catalysts according to Example 1 on glassy carbon to be $3.78 \times 10^{-3}$ mg, while a platinum mesh was employed as a counter electrode.

EXAMPLE 2

Preparation of Catalyst

NaY zeolite was prepared by ion-exchanging HY zeolite with 5M $NH_4NO_3$ twice, and then firing it at 550° C. for 24 hours.

2.7 g of the prepared NaY zeolite powder was dispersed into 950 $cm^3$ of water, and then a mixture powder of $RuCl_3$, $W(CH_3COO)_3$, and Te powder in a mole ratio of 2:1:1.2 was added in a drop-wise manner thereto up to 10 wt % of the entire dispersal solution. Next, the prepared mixture was agitated for 10 hours, and 0.1M of $NaBH_4$ was added thereto to reduce an alloy supported on zeolite. The mixture was filtrated 10 hours later, and the filtrated resultants were dried at 85° C. under a nitrogen flow to prepare a catalyst including the Ru—W—Te alloy supported on zeolite.

The Ru—W—Te alloy included active materials of 57 atom % of Ru, 29 atom % of W, and 14 atom % of Te, and the active materials were supported in an amount of 54 wt %. The catalyst had an average particle diameter of 1.3 nm.

Preparation of Electrode

A working electrode was prepared by loading the catalysts according to Example 2 on glassy carbon to be $3.78 \times 10^{-3}$ mg, while a platinum mesh was employed as a counter electrode.

COMPARATIVE EXAMPLE 1

Preparation of Catalyst 0.6 g of ruthenium carbonyl, 0.03 g of Se powder, and 1 g of ketjen black were added to 150 ml of toluene and mixed at 140° C. for 24 hours to prepare a mixture. The mixture was filtrated, and the filtered resultants were dried at 80° C., gaining a powder. The powder was heated under a hydrogen atmosphere at 250° C. for 3 hours to prepare a RuSe cathode catalyst supported on ketjen black.

The cathode catalyst included active materials of 83 atom % of Ru and 17 atom % of Se, and was supported in an amount of 56 wt % of ketjen black.

Preparation of Electrode

A working electrode was prepared by loading the catalysts according to Example 1 and Comparative Example 1 on glassy carbon to be $3.78 \times 10^{-3}$ mg, respectively while a platinum mesh was employed as a counter electrode.

EVALUATION

An oxygen-saturated sulfuric acid solution was prepared by bubbling oxygen gas for 2 hours in a sulfuric acid solution of a 0.5M concentration. Then, the prepared electrodes were placed into the oxygen-saturated sulfuric acid solution and current density was measured while changing a voltage. The results are provided in the following Table 1.

TABLE 1

|  | Current Density ($mA/cm^2$ (0.7 V)) |
| --- | --- |
| Example 1 | 1.59 |
| Example 2 | 1.59 |
| Comparative Example 1 | 0.41 |

As shown in Table 1, an electrode including a catalyst of Examples 1 and 2 had higher current density than one including a Ru—Se/C catalyst of Comparative Example 1. Accordingly, the catalyst of Examples 1 and 2 proved to have much improved activity compared to that of Comparative Example 1.

Since a cathode catalyst for a fuel cell according to an embodiment of the present invention has excellent activity and selectivity for reduction of an oxidant and is highly stable under an acidic atmosphere, it can improve performance of a membrane-electrode assembly for a fuel cell and a fuel cell system including the same.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for a fuel cell, comprising:
a carrier; and
a ruthenium (Ru)-M-tellurium (Te) alloy supported on the carrier, where M is selected from the group consisting of tungsten (W), molybdenum (Mo), and combinations thereof, and the Ru-M-Te alloy comprises 50 to 70 atom % of Ru, 25 to 30 atom % of M, and 5 to 30 atom % of Te based on the total number of atoms in the Re-M-Te alloy.

2. The catalyst of claim 1, wherein the carrier has a channeling structure.

3. The catalyst of claim 1, wherein the carrier is zeolite.

4. The catalyst of claim 3, wherein the zeolite is selected from the group consisting of A-type, Y-type, and X-type zeolites.

5. The catalyst of claim 3, wherein the zeolite comprises a cation selected from the group consisting of an alkali metal cation, an alkaline-earth metal cation, and a proton.

6. The catalyst of claim 1, wherein the carrier further includes a carbon-based material selected from the group consisting of graphite, denka black, ketjen black, acetylene black, carbon nanotubes, carbon nanofiber, carbon nanowire, carbon nanoballs, activated carbon, and combinations thereof.

7. The catalyst of claim 1, wherein the Ru-M-Te alloy is supported on the carrier in an amount of 5 to 85 wt % based on a total weight of the catalyst.

8. The catalyst of claim 1, wherein the catalyst has an average particle size ranging from 1 to 4 nm.

9. A method of manufacturing a catalyst, comprising:
adding a Ru source, a M source, and a Te source to a zeolite-containing dispersion, where M is selected from the group consisting of tungsten (W), molybdenum (Mo), and combinations thereof, where the Ru-M-Te alloy comprises 50 to 70 atom % of Ru, 25 to 30 atom % of M, and 5 to 30 atom % of Te based on the total number of atoms in the Re-M-Te alloy to obtain a mixture;
adding a reducing agent to the resulting mixture to perform a reduction reaction;
filtrating the resultant product after performing the reduction reaction; and
drying the filtrate.

10. The method of claim 9, wherein the Ru source is a Ru-containing water-soluble salt.

11. The method of claim 9, wherein the M source comprises a water-soluble salt comprising an element selected from the group consisting of Mo, W, and combinations thereof.

12. The method of claim 9, wherein the Te source is selected from the group consisting of Te powders, Te-containing oxide, and mixtures thereof.

13. The method of claim 9, wherein the drying is performed at 60 to 130° C.

14. The catalyst manufactured by the method of claim 9.

15. A membrane-electrode assembly for a fuel cell, comprising:
a cathode comprising a cathode catalyst, the cathode catalyst comprising a carrier and a ruthenium (Ru)-M-tellurium (Te) alloy supported on the carrier, where M is selected from the group consisting of tungsten (W), molybdenum (Mo), and combinations thereof;
an anode facing the cathode; and
an electrolyte interposed between the cathode and anode.

16. The membrane-electrode assembly of claim 15, wherein the carrier comprises zeolite.

17. The membrane-electrode assembly of claim 15, wherein the anode comprises a catalyst selected from the group consisting of platinum, ruthenium, osmium, a platinum-ruthenium alloy, a platinum-osmium alloy, a platinum-palladium alloy, a platinum-M alloy where M is a transition element selected from the group consisting of Ga, Ti, V, Cr, Mn, Fe, Co, Ni, Cu, Zn, Sn, Mo, W, Rh, Ru, and combination thereof, and combinations thereof.

18. A fuel cell system comprising:
at least one electricity generating element comprising:
a membrane-electrode assembly, comprising:
a cathode comprising a cathode catalyst, the cathode catalyst comprising a carrier and a ruthenium (Ru)-M-tellurium (Te) alloy supported on the carrier, where M is selected from the group consisting of tungsten (W), molybdenum (Mo), and combinations thereof, where the Ru-M-Te alloy comprises 50 to 70 atom % of Ru, 25 to 30 atom % of M, and 5 to 30 atom % of Te based on the total number of atoms in the Re-M-Te alloy;
an anode facing the cathode, and
a polymer electrolyte membrane interposed between the cathode and the anode, and
separators arranged at each side of the membrane-electrode assembly;
a fuel supplier supplying the electricity generating element with fuel, and
an oxidant supplier supplying the electricity generating element with oxidant.

19. The membrane-electrode assembly of claim 18, wherein the carrier comprises zeolite.

20. The fuel cell system of claim 18, which is selected from the group consisting of a polymer electrolyte membrane fuel cell, a direct oxidation fuel cell, and a mixed reactant fuel cell.

21. The fuel cell system of claim 18, which is a direct oxidation fuel cell.

* * * * *